United States Patent
Liao et al.

(10) Patent No.: US 11,743,912 B2
(45) Date of Patent: Aug. 29, 2023

(54) METHOD FOR CROSS-CARRIER HARQ MANAGEMENT IN TWO OR MORE SERVING CELLS

(71) Applicant: MEDIATEK INC., Hsinchu (TW)

(72) Inventors: Pei-Kai Liao, Hsinchu (TW); Cheng-Hsun Li, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 154 days.

(21) Appl. No.: 17/351,405

(22) Filed: Jun. 18, 2021

(65) Prior Publication Data
US 2022/0015075 A1    Jan. 13, 2022

Related U.S. Application Data

(60) Provisional application No. 63/049,710, filed on Jul. 9, 2020.

(51) Int. Cl.
*H04W 72/23* (2023.01)
*H04W 72/0453* (2023.01)
*H04L 1/1812* (2023.01)

(52) U.S. Cl.
CPC ........... *H04W 72/23* (2023.01); *H04L 1/1812* (2013.01); *H04W 72/0453* (2013.01)

(58) Field of Classification Search
CPC ............ H04W 72/042; H04W 72/0453; H04L 1/1812; H04L 1/1822; H04L 1/1887;
(Continued)

(56) References Cited

U.S. PATENT DOCUMENTS

| 10,454,632 B2 | 10/2019 | Li et al. | |
| 2012/0269180 A1* | 10/2012 | Li | H04L 5/0055 370/336 |

(Continued)

FOREIGN PATENT DOCUMENTS

| CN | 105743619 A | 7/2016 |
| WO | 2017/209585 A1 | 12/2017 |

OTHER PUBLICATIONS

Chinese language office action dated May 11, 2022, issued in application No. TW 110124694.
(Continued)

*Primary Examiner* — Charles C Jiang
*Assistant Examiner* — Debebe A Asefa
(74) *Attorney, Agent, or Firm* — McClure, Qualey & Rodack, LLP (57) ABSTRACT

A method includes receiving a first higher-layer signal from a base station, wherein the first higher-layer signal enables the use of single PDCCH scheduling PDSCH(s) in two or more serving cells; receiving a second higher-layer signal from the base station, wherein the second higher-layer signal enables the use of cross-carrier HARQ management within the serving cells; receiving DCI in one of the serving cells to obtain the scheduling information of PDSCH(s) in the serving cells; receiving the scheduled PDSCH(s) in the serving cells based on the received DCI to obtain downlink transport blocks carried in the scheduled PDSCH(s); and sending downlink transport blocks to a HARQ entity of the serving cell indicated in the DCI carried in a PDCCH for HARQ management based on a HARQ process number indicated in the DCI carried in the PDCCH.

20 Claims, 7 Drawing Sheets

(58) Field of Classification Search
CPC ..... H04L 1/1835; H04L 5/001; H04L 5/0055; H04L 5/0094
See application file for complete search history.

(56) References Cited

U.S. PATENT DOCUMENTS

| | | |
|---|---|---|
| 2014/0079008 A1* | 3/2014 | Park ................. H04L 5/0053 370/329 |
| 2016/0100382 A1* | 4/2016 | He ................... H04L 5/001 370/329 |
| 2019/0150187 A1 | 5/2019 | Park et al. |
| 2020/0022175 A1 | 1/2020 | Xiong et al. |
| 2022/0141857 A1* | 5/2022 | Lee ............... H04W 72/1226 370/329 |

OTHER PUBLICATIONS

3GPP TS 38.213 V16.1.1; 3rd Generation Partnership Project; Technical Specification Group Radio Access Network; NR; Physical layer procedures for control (Release 16); Mar. 2020; pp. 1-156.
3GPP TS 38.331 V16.0.0; "3rd Generation Partnership Project; Technical Specification Group Radio Access Network; NR; Radio Resource Control (RRC) protocol specification (Release 16);" Mar. 2020; pp. 1-835.
3GPP TS 38.213 V16.1.0; "3rd Generation Partnership Project; Technical Specification Group Radio Access Network; NR; Physical layer procedures for control (Release 16)"; Mar. 2020; pp. 1-156.

\* cited by examiner

METHOD FOR CROSS-CARRIER HARQ MANAGEMENT IN TWO OR MORE SERVING CELLS

CROSS REFERENCE TO RELATED APPLICATIONS

This application claims priority of and the benefit of U.S. Provisional Application No. 63/049,710, filed on Jul. 9, 2020, the entirety of which is incorporated by reference herein.

FIELD OF THE DISCLOSURE

The disclosure is related to a scheduling method, and in particular it is related to a method for performing downlink control information (DCI)-based cross-carrier scheduling in carrier aggregation.

DESCRIPTION OF THE RELATED ART

Compared to single-carrier operation, there is a major shortcoming in 3GPP Rel-15/16 5G-NR in terms of DL transmission efficiency for carrier aggregation. This shortcoming is lower DL data efficiency. In general, HARQ management is restricted to a single serving cell (or carrier) only, and no cross-carrier management is allowed.

In addition, it's possible to apply single-carrier operation in a contiguous spectrum. However, carrier aggregation is needed for a non-contiguous spectrum in either an intra-band or inter-band case. The above restriction results in longer transmission times to achieve the same reliability, compared to single-carrier operation with the same system bandwidth.

BRIEF SUMMARY OF THE DISCLOSURE

In order to resolve the issue described above, the present disclosure provides a method for cross-carrier HARQ management in two or more serving cells. The method includes receiving a first higher-layer signal from a base station, wherein the first higher-layer signal enables the use of single PDCCH scheduling PDSCH(s) in two or more serving cells; receiving a second higher-layer signal from the base station, wherein the second higher-layer signal enables the use of cross-carrier HARQ management within the serving cells; receiving DCI in one of the serving cells to obtain the scheduling information of PDSCH(s) in the serving cells; receiving the scheduled PDSCH(s) in the serving cells based on the received DCI to obtain downlink transport blocks carried in the scheduled PDSCH(s); and sending downlink transport blocks to a HARQ entity of the serving cell indicated in the DCI carried in a PDCCH for HARQ management based on a HARQ process number indicated in the DCI carried in the PDCCH.

According to the method disclosed above, the second higher-layer signal includes a cross-carrier HARQ management enabler to indicate whether cross-carrier HARQ management is enabled.

According to the method disclosed above, the DCI in the serving cell includes a carrier indicator to indicate which serving cell for PDSCH scheduling is using the DCI, and to indicate which HARQ entity is for HARQ operation for the serving cells.

According to the method disclosed above, the DCI in the serving cell is generated by DCI aggregation of all serving cells.

According to the method disclosed above, the DCI aggregation is 1-stage DCI aggregation; when the DCI aggregation is 1-stage DCI aggregation, the DCI in the serving cell includes the scheduling information of PDSCH(s) in the serving cells.

According to the method disclosed above, the DCI aggregation is 2-stage DCI aggregation; when the DCI aggregation is 2-stage DCI aggregation, the DCI in the serving cell includes a first-stage DCI and a second-stage DCI.

According to the method disclosed above, the first-stage DCI provides the information related to the corresponding second-stage DCI, and the second-stage DCI provides the scheduling information of PDSCH(s) in the serving cells.

According to the method disclosed above, the first-stage DCI provides the scheduling information of PDSCH in the serving cell and the information related to the corresponding second-stage DCI, and the second-stage DCI provides the scheduling information of PDSCH(s) in the serving cells except for the one scheduled by the first-stage DCI.

According to the method disclosed above, the HARQ process number indicates which HARQ process of the HARQ entity is being used.

According to the method disclosed above, the HARQ entity includes a total of 16 HARQ processes in the time domain.

The present disclosure also provides a method for cross-carrier HARQ management in two or more serving cells. The method includes receiving a first higher-layer signal from a base station, wherein the first higher-layer signal enables the use of single PDCCH scheduling PUSCH(s) in two or more serving cells; receiving a second higher-layer signal from the base station, wherein the second higher-layer signal enables the use of cross-carrier HARQ management within the serving cells; receiving DCI in one of the serving cells to obtain the scheduling information of PUSCH(s) in the serving cells; distributing uplink transport blocks to the scheduled PUSCH(s) in the serving cells from a HARQ entity of the serving cell indicated in the DCI carried in a PDCCH for HARQ management based on a HARQ process number indicated in the DCI carried in the PDCCH; and transmitting the scheduled PUSCH(s) in the serving cells based on the received DCI.

According to the method disclosed above, the second higher-layer signal incudes a cross-carrier HARQ management enabler to indicate whether cross-carrier HARQ management is enabled.

According to the method disclosed above, the DCI in the serving cell includes a carrier indicator to indicate which serving cell for PUSCH scheduling is using the DCI, and to indicate which HARQ entity is for HARQ operation for the serving cells.

According to the method disclosed above, the DCI in the serving cell is generated by DCI aggregation of all serving cells.

According to the method disclosed above, the DCI aggregation is 1-stage DCI aggregation; when the DCI aggregation is 1-stage DCI aggregation, the DCI in the serving cell includes the scheduling information of PUSCH(s) in the serving cells.

According to the method disclosed above, the DCI aggregation is 2-stage DCI aggregation; when the DCI aggregation is 2-stage DCI aggregation, the DCI in the serving cell includes a first-stage DCI and a second-stage DCI.

According to the method disclosed above, the first-stage DCI provides the information related to the corresponding second-stage DCI, and the second-stage DCI provides the scheduling information of PUSCH(s) in the serving cells.

According to the method disclosed above, the first-stage DCI provides the scheduling information of PUSCH in the serving cell and the information related to the corresponding second-stage DCI, and the second-stage DCI provides the scheduling information of PUSCH(s) in the serving cells except for the one scheduled by the first-stage DCI.

According to the method disclosed above, the HARQ process number indicates the HARQ process of the HARQ entity.

According to the method disclosed above, the HARQ entity includes a total of 16 HARQ processes in the time domain.

BRIEF DESCRIPTION OF THE DRAWINGS

The disclosure can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration. This means that many special details, relationships and methods are disclosed to provide a complete understanding of the disclosure.

DETAILED DESCRIPTION OF THE DISCLOSURE

In order to make the above purposes, features, and advantages of some embodiments of the present disclosure more comprehensible, the following is a detailed description in conjunction with the accompanying drawings.

It should be understood that the words "comprise" and include used in the present disclosure are used to indicate the existence of specific technical features, values, method steps, operations, units and/or components. However, it does not exclude that more technical features, numerical values, method steps, work processes, units, components, or any combination of the above can be added.

The words "first", "second", "third", "fourth", "fifth", and "sixth" are used to describe components, they are not used to indicate the priority order of or advance relationship, but only to distinguish components with the same name.

Figure 1:
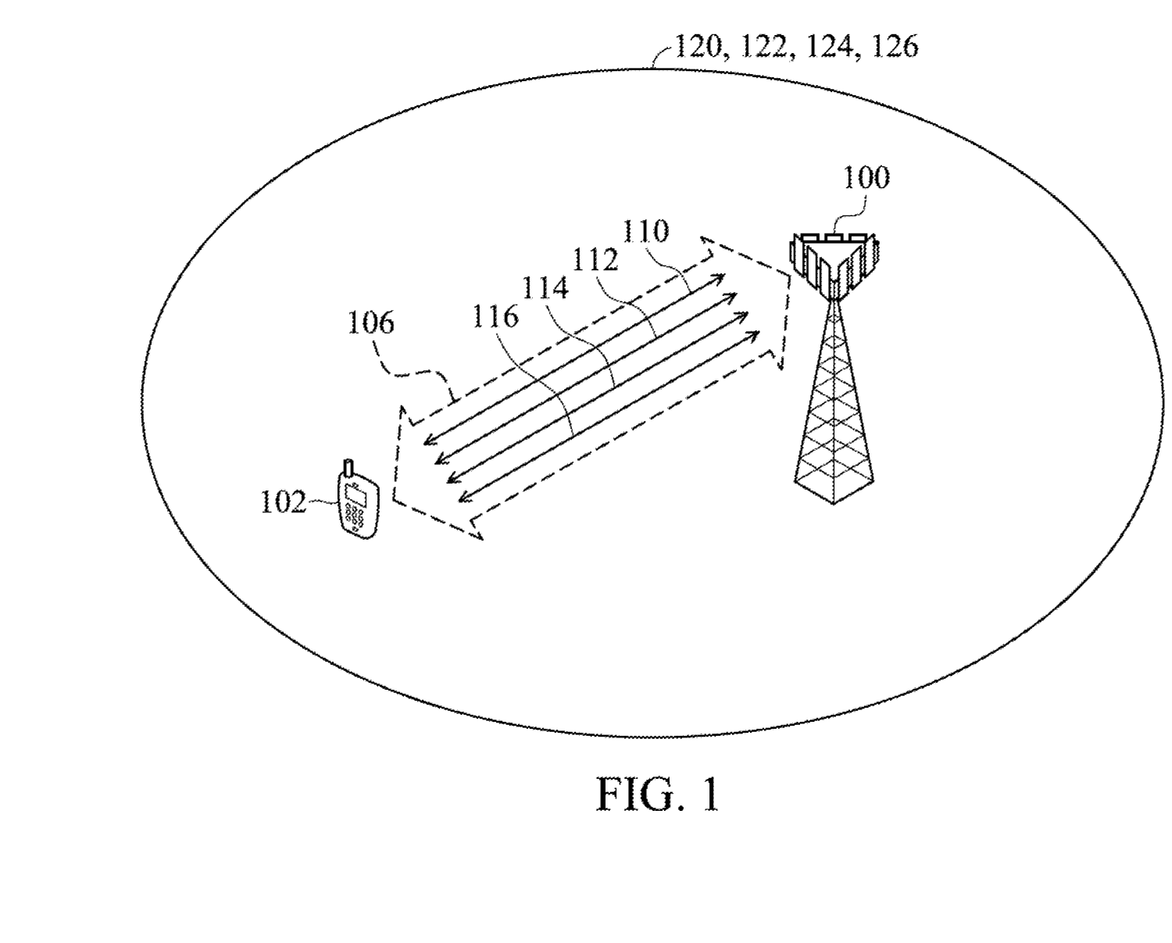
FIG. 1 is a schematic diagram of a scene of performing downlink control information (DCI)-based cross-carrier scheduling in carrier aggregation in accordance with some embodiments of the disclosure.

FIG. 1 is a schematic diagram of a scene of performing downlink control information (DCI)-based cross-carrier scheduling in carrier aggregation in accordance with some embodiments of the disclosure. As shown in FIG. 1, the scene in FIG. 1 includes a base station 100 and a UE 102. In some embodiments, the base station 100 can support New Radio (NR) with carrier aggregation. For example, the base station 100 can be a gNB, but the present disclosure is not limited thereto. The UE 102 may communicate with the base station 100 through an aggregated channel 106 including multiple carriers, such as a carrier 110, a carrier 112, a carrier 114, and a carrier 116.

In some embodiments, the UE 102 is able to connect with the base station 100 by Radio Resource Control (RRC) signaling on the carriers 110, 112, 114 and 116. For example, the UE 102 in a serving cell 120 is connected with the base station 100 through the carrier 110. The UE 102 in a serving cell 122 is connected with the base station 100 through the carrier 112. The UE 102 in a serving cell 124 is connected with the base station 100 through carrier 114. The UE 102 in a serving cell 126 is connected with the base station 100 through carrier 116. In FIG. 1, the serving cell 120 completely overlaps the serving cells 122, 124, and 126, but the present disclosure is not limited thereto.

In some embodiments, the UE 102 receives a first higher-layer (or RRC-layer) signal from the base station 100, and the first higher-layer signal enables the use of single PDCCH scheduling PDSCH(s) in two or more serving cells. When the UE 102 is configured with single PDCCH scheduling PDSCH in two or more serving cells via the first higher-layer signal from the base station 100, the UE 102 can be further configured via a second higher-layer (or RRC-layer) signal from the base station 100 to enable cross-carrier HARQ management.

In some embodiments, cross-carrier HARQ management can be configured separately for downlink (DL) only, uplink (UL) only, or both DL and UL via the second higher-layer signal from the base station 100. In some embodiments, the first and second higher-layer signals can be two separate high-layer signals, or can also be combined into one high-layer signal, the present disclosure is not limited thereto.

When the UE 102 is configured to enable cross-carrier HARQ management, the scheduling DCI includes the following information to enable per-slot switch between per-carrier HARQ management (for example, legacy behavior) and cross-carrier HARQ management. In some embodiments, the second higher-layer signal includes a cross-carrier HARQ management enabler to indicate whether cross-carrier HARQ management is enabled. For example, if the cross-carrier HARQ management enabler indicates that cross-carrier HARQ management is enabled, the UE 102 may enter an advanced mode. If the cross-carrier HARQ management enabler indicates that cross-carrier HARQ management is disabled, the UE may enter a legacy mode.

In some embodiments, the UE 102 receives DCI in one of the serving cells (for example, serving cells 120, 122, 124 or 126) to obtain the scheduling information of PDSCH(s) in the serving cells from the base station 100. The DCI received by the UE 102 is generated by DCI aggregation of all of the serving cells (for example, serving cells 120, 122, 124 and 126). That is, the DCI received by the UE 102 may include the scheduling information of PDSCH(s) of the serving cells 120, 122, 124 and 126. The DCI includes a carrier indicator to indicate which serving cell for PDSCH scheduling is using the DCI. The carrier indicator also indicates which HARQ entity is for HARQ operation for the serving cells.

In some embodiments, the DCI aggregation may be 1-stage DCI aggregation or 2-stage DCI aggregation. When the DCI aggregation is 1-stage DCI aggregation, the DCI in the serving cell (for example, serving cells 120, 122, 124 or 126) includes the scheduling information of PDSCH(s) of the serving cells (for example, serving cells 120, 122, 124 and 126). When the DCI aggregation is 2-stage DCI aggregation, the DCI in the serving cell includes a first-stage DCI and a second-stage DCI. In some embodiments, if the UE is configured with cross-carrier HARQ management and 2-stage DCI based cross-carrier scheduling (that is, 2-stage DCI aggregation) for two or more serving cells, the cross-carrier HARQ management enabler (or cross-carrier HARQ management indication) is included in the first-stage DCI.

In some embodiments of 2-stage DCI aggregation, the first-stage DCI provides the information related to the corresponding second-stage DCI, and the second-stage DCI provides the scheduling information of PDSCH(s) of the serving cells (for example, serving cells 120, 122, 124, and 126). In some embodiments, the information related to the corresponding second-stage DCI in the first-stage DCI at least includes information related to the scheduled serving cells (for example, serving cells 120, 122, 124, and 126) scheduled by the second-stage DCI, modulation order of the second-stage DCI, time-frequency location and size of an occupied radio resource for the scheduling information of the scheduled serving cells (for example, serving cells 120, 122, 124, and 126) in the second-stage DCI, and antenna port of a reference signal used for demodulation of the second-stage DCI.

In some embodiments of 2-stage DCI aggregation, the first-stage DCI provides the scheduling information of PDSCH in the serving cell (for example, serving cell 120) and the information related to the corresponding second-stage DCI, and the second-stage DCI provides the scheduling information of PDSCH(s) of the serving cells except for the one scheduled by the first-stage DCI (for example, serving cells 122, 124 and 126).

In some embodiments, the information related to the corresponding second-stage DCI in the first-stage DCI at least includes information related to the scheduled serving cells (for example, serving cells 122, 124, and 126) scheduled by the second-stage DCI, the modulation order of the second-stage DCI, the time-frequency location and size of an occupied radio resource for the scheduling information of the scheduled serving cells (for example, serving cells 122, 124, and 126) in the second-stage DCI and the antenna port of the reference signal used for demodulation of the second-stage DCI.

After the DCI is received by the UE 102, the UE 102 receives the scheduled PDSCH(s) in the serving cells based on the received DCI to obtain downlink transport blocks carried in the scheduled PDSCH(s). Then, the UE 102 sends downlink transport blocks to a HARQ entity of the serving cell (for example, serving cell 120) indicated in the DCI carried in a PDCCH for HARQ management based on a HARQ process number indicated in the DCI carried in the PDCCH. In some embodiments, the HARQ process number indicates the HARQ process of the HARQ entity. In some embodiments, the HARQ entity includes a total of 16 HARQ processes in the time domain, but the present disclosure is not limited thereto.

Figure 2A:
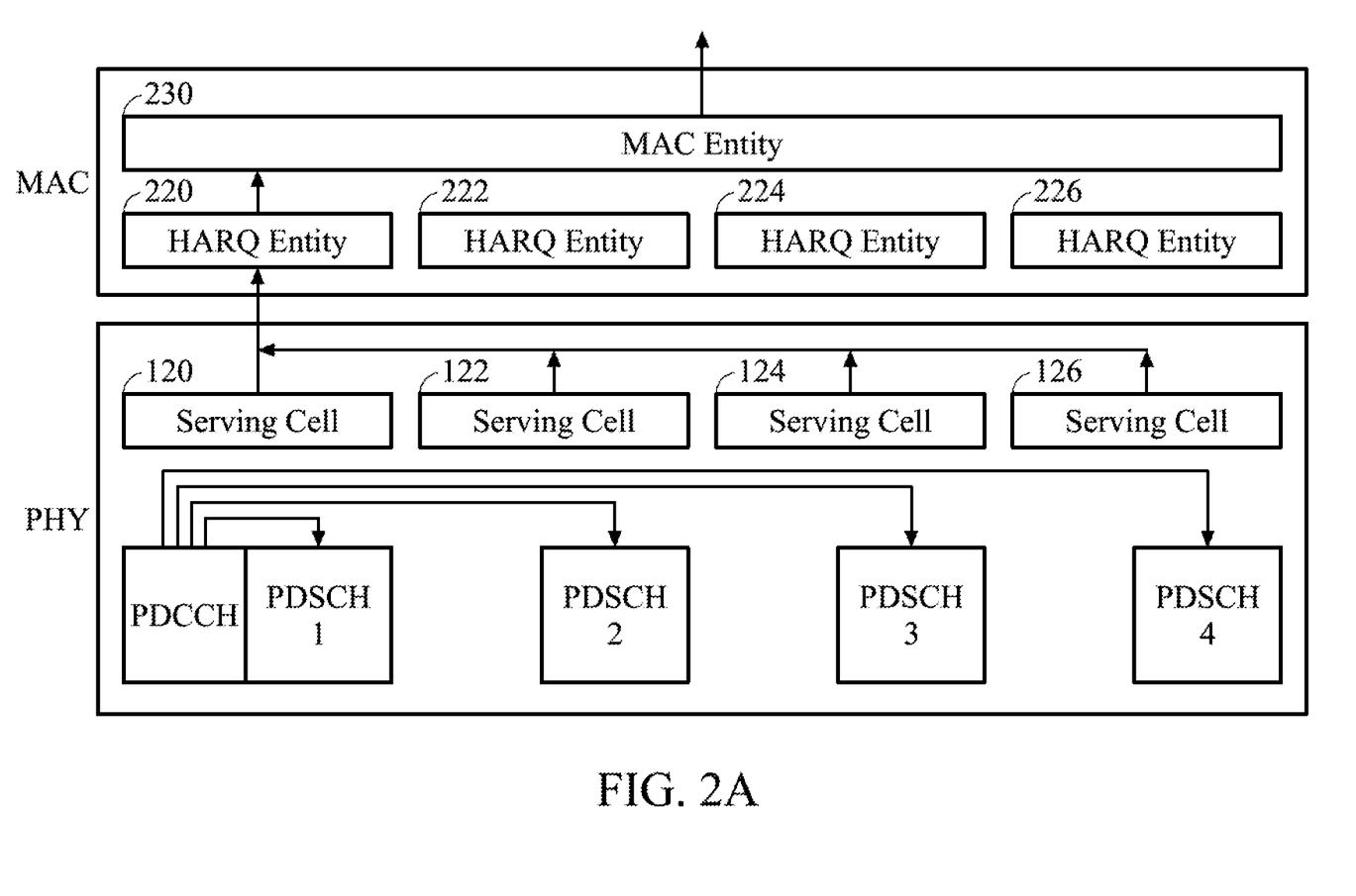
FIG. 2A is a schematic diagram of cross-carrier HARQ management for UE DL reception in accordance with some embodiments of the disclosure.

FIG. 2A is a schematic diagram of cross-carrier HARQ management for UE 102 DL reception in accordance with some embodiments of the disclosure. As shown in FIG. 2A and FIG. 1, after the UE 102 is connected with the base station 100 by RRC signaling on the carriers 110, 112, 114 and 116, the serving cells 120, 122, 124 and 126 are indicated in a physical layer (PHY) of the UE 102, and a PDCCH scheduling PDSCH 1, PDSCH 2, PDSCH 3, and PSSCH 4 are indicated in the physical layer of the UE 102. In addition, after the UE 102 is connected with the base station 100 by RRC signaling on the carriers 110, 112, 114 and 116, HARQ entities 220, 222, 224, and 226 and a MAC entity 230 is indicated by a MAC layer of the UE 102.

When the UE 102 is indicated in the scheduling DCI (in PDCCH) to enable cross-carrier HARQ management for DL reception, the UE 102 forwards code-words (CW) carried in PDSCHs (for example, PDSCH 1~4) received over the indicated (in DCI) or configured (in RRC signal) set of serving cells to a HARQ entity (for example, HARQ entity 220) indicated in a carrier indicator bit-field and a HARQ process number bit-filed or the DCI carried in a PDCCH.

For example, in some embodiments in FIG. 2A, the carrier indicator in the DCI carried in the PDCCH indicates that code-words (and/or downlink transport blocks) in PDSCHs (for example, PDSCH 1~4) are able to be forwarded to the HARQ entity 220. Traditionally, for example, in the prior art, code-words in the serving cell 120 should be forwarded to the HARQ entity 220, code-words in the serving cell 122 should be forwarded to the HARQ entity 222, code-words in the serving cell 124 should be forwarded to the HARQ entity 224, and code-words in the serving cell 126 should be forwarded to the HARQ entity 226. After that, the MAC entity 230 forwards the code-words and/or the downlink transport blocks to the higher layer such as PDCP layer or RLC layer.

In some embodiments of FIG. 2A, the MAC layer of the UE 102 further includes an HARQ buffer (not shown) corresponding to the HARQ entity 220. The HARQ buffer is able to store the code-words which are forwarded to the HARQ entity 220, and is able to check whether the code-words are correct or not. If the code-words are correct, the current code-words stored in the HARQ buffer may be erased, so that the HARQ buffer is able to store the next code-words for the next check. If the code-words are incorrect, the current code-words stored in the HARQ buffer may be remained, so that after the HARQ entity 220 receives the resending code-words from the PDSCHs 1~4, the MAC entity 230 is able to recheck the resending code-words again through the code-words stored in the HARQ buffer.

Figure 2B:
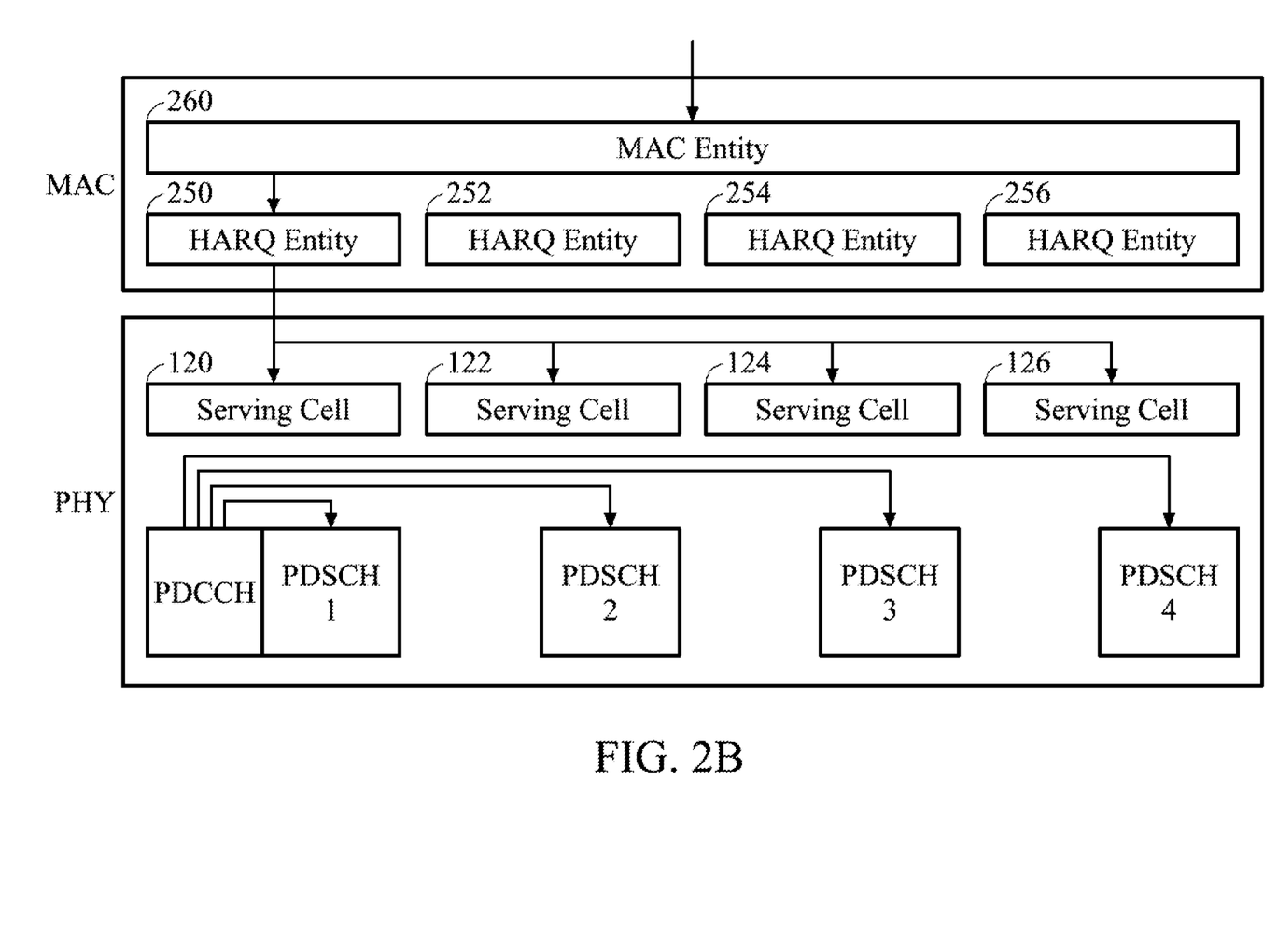
FIG. 2B is a schematic diagram of cross-carrier HARQ management for base station DL transmission in accordance with some embodiments of the disclosure.

FIG. 2B is a schematic diagram of cross-carrier HARQ management for base station 100 DL transmission in accordance with some embodiments of the disclosure. As shown in FIG. 2B and FIG. 1, after the UE 102 is connected with the base station 100 by RRC signaling on the carriers 110, 112, 114 and 116, the serving cells 120, 122, 124 and 126 are indicated in a physical layer (PHY) of the base station 100, and a PDCCH scheduling PDSCH 1, PDSCH 2, PDSCH 3, and PSSCH 4 are indicated in the physical layer of the base station 100. In addition, after the UE 102 is connected with the base station 100 by RRC signaling on the carriers 110, 112, 114 and 116, HARQ entities 250, 252, 254, and 256 and a MAC entity 260 is indicated by a MAC layer of the base station 100.

When the base station 100 indicating in the DCI to the UE 102 enables cross-carrier HARQ management for DL transmission, the higher layer of the base station 100 (such as PSCP layer and/or RLC layer) sends code-words to a MAC entity 260 of the base station 100. Then, the base station 100 distributes the code-words (and/or downlink transport blocks) from the HARQ entity (for example, HARQ entity 250) indicated in the carrier indicator bit-field and the HARQ process number bit-field of the DCI carried in a PDCCH to PDSCHs (for example, PDSCH 1~4) to be transmitted over the indicated (in DCI) or configured (in RRC signal) set of serving cells (for example, serving cells 120, 122, 124 and 126).

For example, in some embodiments in FIG. 2B, the carrier indicator in the DCI carried in the PDCCH indicates that the HARQ entity 220 is able to distribute the code-words to the serving cells 120, 122, 124 and 126. Traditionally, for example, in the prior art, the HARQ entity 250 transits code-words to the serving cell 120, the HARQ entity 252 transmits code-words to the serving cell 122, the HARQ entity 254 transmits code-words to the serving cell 124, and the HARQ entity 256 transmits code-words to the serving cell 126.

In some embodiments, the UE 102 receives a first higher-layer signal from the base station 100. The first higher-layer signal enables the use of single PDCCH scheduling PUSCH (s) in two or more serving cells. Then, the UE 102 receives a second higher-layer signal from the base station 100. The second higher-layer signal enables the use of cross-carrier HARQ management within the serving cells. In some embodiments, the first and second higher-layer signals can be two separate high-layer signals, or can also be combined into one high-layer signal, the present disclosure is not limited thereto.

After that, the UE 102 receives DCI in one of the serving cells to obtain the scheduling information of PUSCH(s) of the serving cells (for example, serving cells 120, 122, 124 and 126). The DCI received by the UE 102 is generated by DCI aggregation of all of the serving cells (for example, serving cells 120, 122, 124 and 126). That is, the DCI received by the UE 102 may include the scheduling information of PUSCH(s) of the serving cells 120, 122, 124 and 126. Then, the UE 102 distributes uplink transport blocks to the scheduled PUSCH(s) in the serving cells from a HARQ entity of the serving cell indicated in the DCI carried in a PDCCH for HARQ management based on a HARQ process number indicated in the DCI carried in the PDCCH. Finally, the UE 102 transmits the scheduled PUSCH(s) in the serving cells based on the received DCI.

Figure 3A:
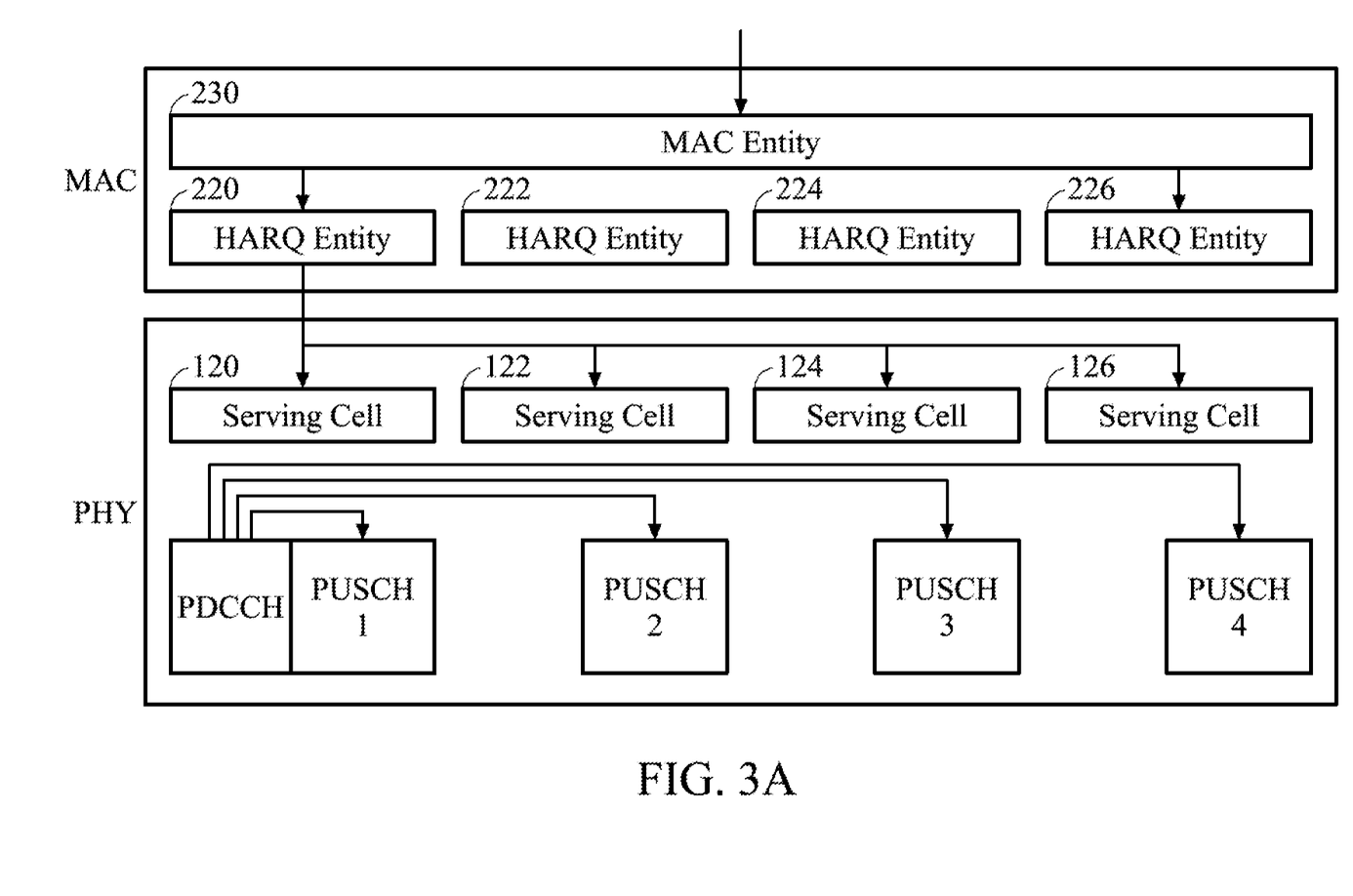
FIG. 3A is a schematic diagram of cross-carrier HARQ management for UE UL transmission in accordance with some embodiments of the disclosure.

FIG. 3A is a schematic diagram of cross-carrier HARQ management for UE 102 UL transmission in accordance with some embodiments of the disclosure. As shown in FIG. 3A and FIG. 1, after the UE 102 is connected with the base station 100 by RRC signaling on the carriers 110, 112, 114 and 116, the serving cells 120, 122, 124 and 126 are indicated in a physical layer (PHY) of the UE 102, and a PDCCH scheduling PDSCH 1, PDSCH 2, PDSCH 3, and PSSCH 4 are indicated in the physical layer of the UE 102. In addition, after the UE 102 is connected with the base station 100 by RRC signaling on the carriers 110, 112, 114 and 116, HARQ entities 220, 222, 224, and 226 and a MAC entity 230 is indicated by a MAC layer of the UE 102.

When the UE 102 is indicated in the DCI to enable cross-carrier HARQ management for UL transmission, the higher layer of the UE 102 (such as PDCP layer and/or RLC layer) sends code-words to the MAC entity 230 of the UE 102. The UE 102 distributes the code-words from the MAC entity 230 indicated in the carrier indicator bit-field and the HARQ process number bit-field of the DCI carried in a PDCCH to PUSCHs (for example, PUSCHs 1~4) to be transmitted over the indicated (by DCI) or configured (by RRC signal) set of serving cells.

For example, in some embodiments in FIG. 3A, the carrier indicator in the DCI carried in the PDCCH indicates that the HARQ entity 220 is able to distribute the code-words to the serving cells 120, 122, 124 and 126. Traditionally, for example, in the prior art, the HARQ entity 220 transits code-words to the serving cell 120, the HARQ entity 222 transmits code-words to the serving cell 122, the HARQ entity 224 transmits code-words to the serving cell 124, and the HARQ entity 226 transmits code-words to the serving cell 126.

Figure 3B:
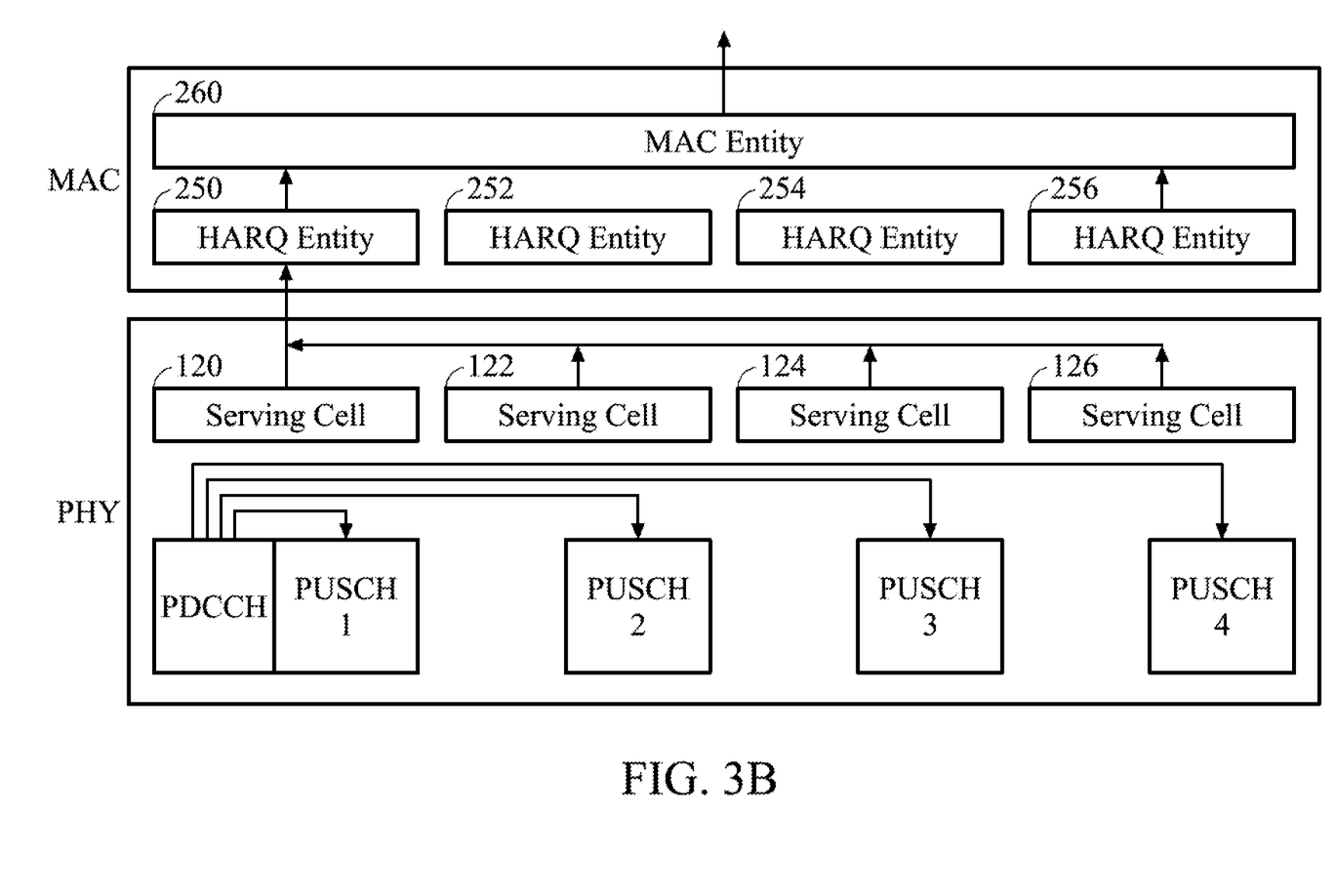
FIG. 3B is a schematic diagram of cross-carrier HARQ management for base station UL reception in accordance with some embodiments of the disclosure.

FIG. 3B is a schematic diagram of cross-carrier HARQ management for base station 100 UL reception in accordance with some embodiments of the disclosure. As shown in FIG. 3B and FIG. 1, after the UE 102 is connected with the base station 100 by RRC signaling on the carriers 110, 112, 114 and 116, the serving cells 120, 122, 124 and 126 are indicated in a physical layer (PHY) of the base station 100, and a PDCCH scheduling PDSCH 1, PDSCH 2, PDSCH 3, and PSSCH 4 are indicated in the physical layer of the base station 100. In addition, after the UE 102 is connected with the base station 100 by RRC signaling on the carriers 110, 112, 114 and 116, HARQ entities 250, 252, 254, and 256 and a MAC entity 260 is indicated by a MAC layer of the base station 100.

When the base station 100 indicating in the DCI to the UE 102 to enable cross-carrier HARQ management for UL reception, the base station 100 forwards code-words carried in the PUSCHs (for example, PUSCHs 1~4) received over the indicated (in DCI) or configured (in RRC signal) set of serving cells (for example, serving cells 120, 122, 124 and 126) to the HARQ entity (for example, HARQ entity 250) indicated in the carrier indicator bit-field and the HARQ process number bit-field of the DCI carried in a PDCCH.

For example, in some embodiments in FIG. 3B, the carrier indicator in the DCI carried in the PDCCH indicates that code-words (and/or uplink transport blocks) in PUSCHs (for example, PUSCH 1~4) are able to be forwarded to the HARQ entity 250. Traditionally, for example, in the prior art, code-words in the serving cell 120 should be forwarded to the HARQ entity 250, code-words in the serving cell 122 should be forwarded to the HARQ entity 252, code-words in the serving cell 124 should be forwarded to the HARQ entity 254, and code-words in the serving cell 126 should be forwarded to the HARQ entity 256. After that, the MAC entity 260 forwards the code-words and/or the uplink transport blocks to the higher layer such as PDCP layer or RLC layer.

Figure 4:
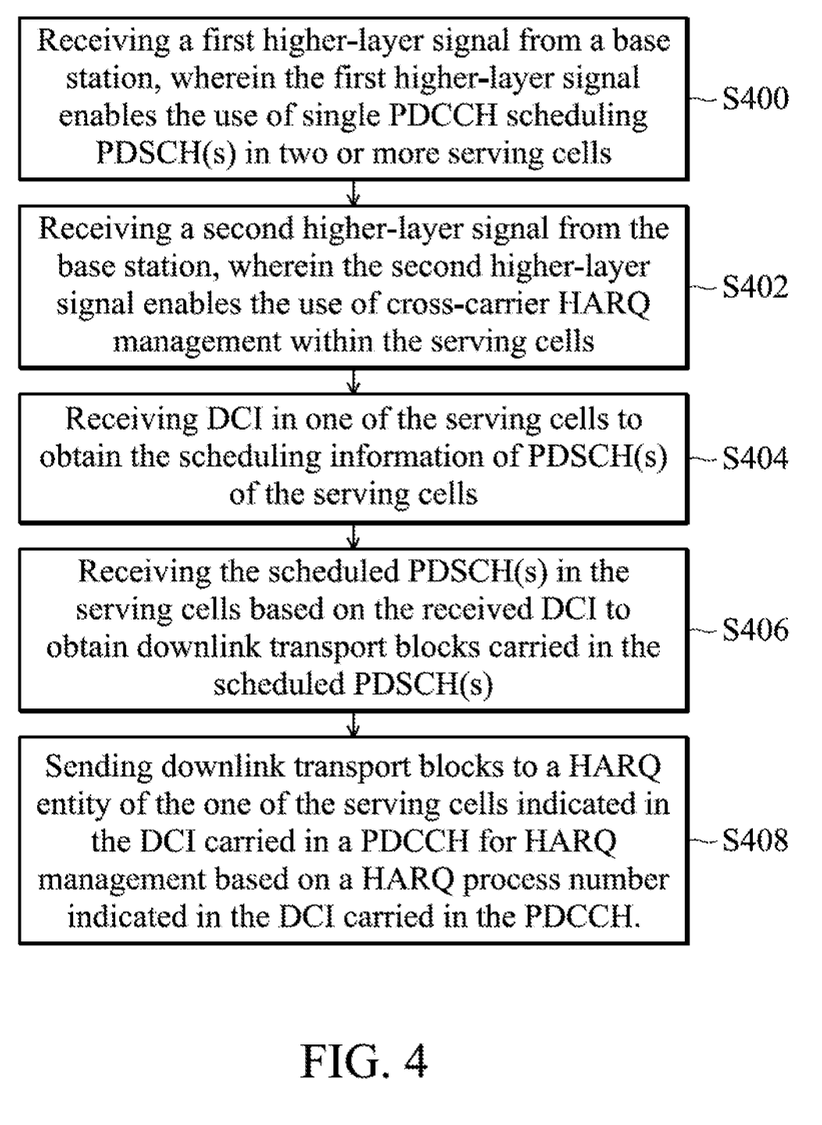
FIG. 4 is a flow chart of a method for cross-carrier HARQ management in two or more serving cells for UE DL reception in accordance with some embodiments of the disclosure.

In some embodiments of FIG. 3B, the MAC layer of the base station 100 further includes an HARQ buffer (not shown) corresponding to the HARQ entity 250. The HARQ buffer is able to store the code-words which are forwarded to the HARQ entity 250, and is able to check whether the code-words are correct or not. If the code-words are correct, the current code-words stored in the HARQ buffer may be erased, so that the HARQ buffer is able to store the next code-words for the next check. If the code-words are incorrect, the current code-words stored in the HARQ buffer may be remained, so that after the HARQ entity 250 receives the resending code-words from the PDSCHs 1~4, the MAC entity 230 is able to recheck the resending code-words again through the code-words stored in the HARQ buffer FIG. 4 is a flow chart of a method for cross-carrier HARQ management in two or more serving cells for UE DL reception in accordance with some embodiments of the disclosure. The method for cross-carrier HARQ management in two or more serving cells for UE DL reception includes: receiving a first higher-layer signal from a base station, wherein the first higher-layer signal enables the use of single PDCCH scheduling PDSCH(s) in two or more serving cells (step S400); receiving a second higher-layer signal from the base station, wherein the second higher-layer signal enables the use of cross-carrier HARQ management within the serving cells (step S402); and receiving DCI in one of the serving cells to obtain the scheduling information of PDSCH(s) of the serving cells (step S404).

The method for cross-carrier HARQ management in two or more serving cells for UE DL reception further includes: receiving the scheduled PDSCH(s) in the serving cells based on the received DCI to obtain downlink transport blocks carried in the scheduled PDSCH(s) (step S406); and sending downlink transport blocks to a HARQ entity of the serving cell indicated in the DCI carried in a PDCCH for HARQ management based on a HARQ process number indicated in the DCI carried in the PDCCH (step S408). In some embodiments, steps S400~S408 may be performed by the UE 102 in FIG. 1, but the present disclosure is not limited thereto.

Figure 5:
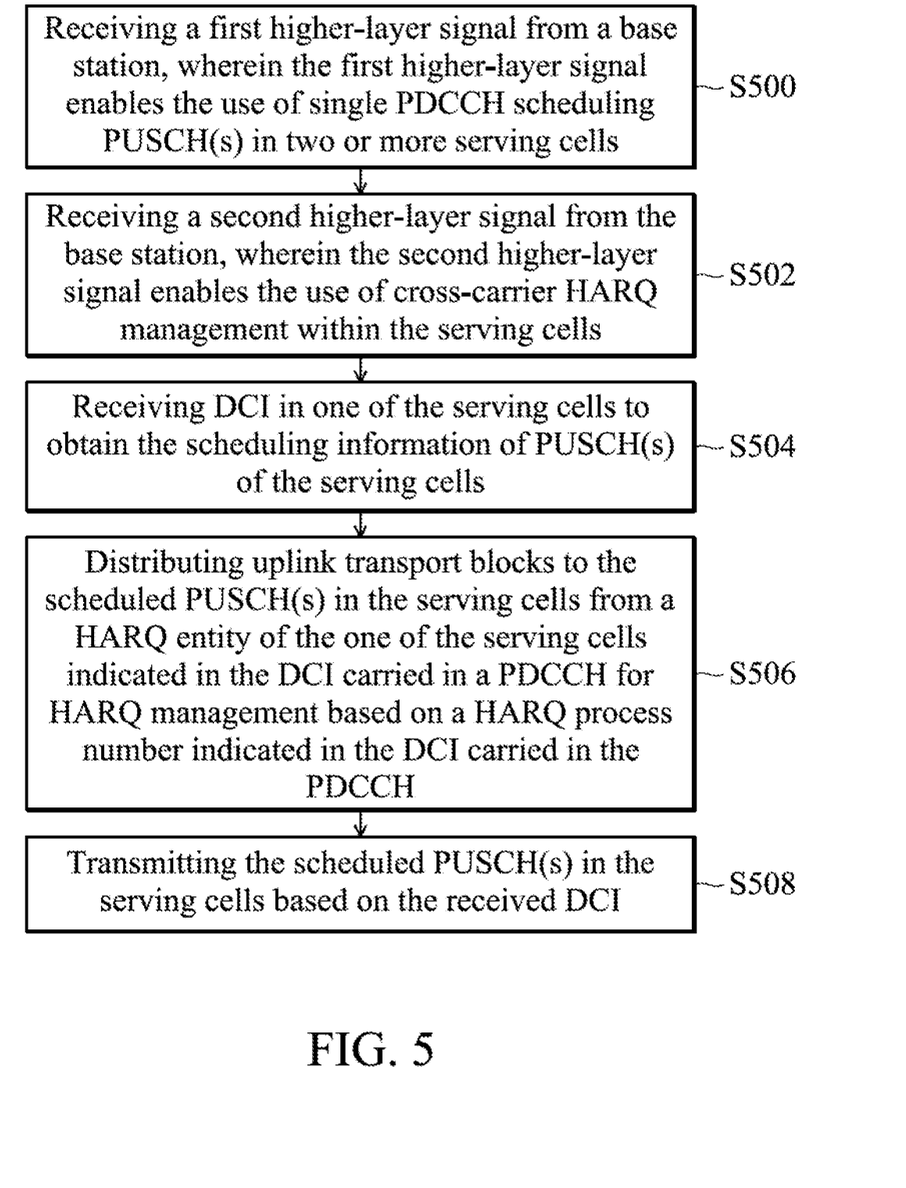
FIG. 5 is a flow chart of a method for cross-carrier HARQ management in two or more serving cells for UE UL transmission in accordance with some embodiments of the disclosure.

FIG. 5 is a flow chart of a method for cross-carrier HARQ management in two or more serving cells for UE UL transmission in accordance with some embodiments of the disclosure. The method for cross-carrier HARQ management in two or more serving cells for UE UL transmission includes: receiving a first higher-layer signal from a base station, wherein the first higher-layer signal enables the use of single PDCCH scheduling PUSCH(s) in two or more serving cells (step S500); receiving a second higher-layer signal from the base station, wherein the second higher-layer signal enables the use of cross-carrier HARQ management within the serving cells (step S502); and receiving DCI in one of the serving cells to obtain the scheduling information of PUSCH(s) of the serving cells (step S504).

The method for cross-carrier HARQ management in two or more serving cells for UE UL transmission further includes: distributing uplink transport blocks to the scheduled PUSCH(s) in the serving cells from a HARQ entity of the serving cell indicated in the DCI carried in a PDCCH for HARQ management based on a HARQ process number indicated in the DCI carried in the PDCCH (step S506); and transmitting the scheduled PUSCH(s) in the serving cells based on the received DCI (step S508). In some embodiments, steps S500~S508 may be performed by the UE 102 in FIG. 1, but the present disclosure is not limited thereto.

This present disclosure proposes a design to use single PDCCH on a carrier to schedule PDSCH or PUSCH in two or more serving cells in carrier aggregation to get similar downlink and uplink transmission efficiency as single carrier. Cross-carrier HARQ management for the scheduled PDSCHs or PUSCHs in two or more serving cells is included in the proposed design in the present disclosure. The PDSCHs or PUSCHs are scheduled by single DCI.

The embodiments of the present disclosure are disclosed above, but they are not used to limit the scope of the present disclosure. A person skilled in the art can make some changes and retouches without departing from the spirit and scope of the embodiments of the present disclosure. Therefore, the scope of protection in the present disclosure shall be defined by the scope of the attached claims.

What is claimed is:

1. A method, comprising:
receiving a first higher-layer signal from a base station, wherein the first higher-layer signal enables the use of single PDCCH scheduling PDSCH(s) in two or more serving cells;
receiving a second higher-layer signal from the base station, wherein the second higher-layer signal enables the use of cross-carrier HARQ management within the serving cells;
receiving DCI in one of the serving cells to obtain the scheduling information of the PDSCH(s) of the serving cells;
receiving the scheduled PDSCH(s) in the serving cells based on the received DCI to obtain downlink transport blocks carried in the scheduled PDSCH(s); and
sending downlink transport blocks obtained from the scheduled PDSCH(s) to a HARQ entity of the one of the serving cells indicated in the DCI carried in a PDCCH for HARQ management based on a HARQ process number indicated in the DCI carried in the PDCCH.

2. The method as claimed in claim 1, wherein the second higher-layer signal comprises a cross-carrier HARQ management enabler to indicate whether cross-carrier HARQ management is enabled.

3. The method as claimed in claim 1, wherein the DCI in the one of the serving cells comprises a carrier indicator to indicate which serving cell for PDSCH scheduling is using the DCI, and to indicate which HARQ entity is for HARQ operation in the serving cells.

4. The method as claimed in claim 1, wherein the DCI in the one of the serving cells is generated by DCI aggregation of all of the serving cells.

5. The method as claimed in claim 4, wherein the DCI aggregation is 1-stage DCI aggregation; when the DCI aggregation is 1-stage DCI aggregation, the DCI in the one of the serving cells comprises the scheduling information of PDSCH(s) of the serving cells.

6. The method as claimed in claim 4, wherein the DCI aggregation is 2-stage DCI aggregation; when the DCI aggregation is 2-stage DCI aggregation, the DCI in the one of the serving cells comprises a first-stage DCI and a second-stage DCI.

7. The method as claimed in claim 6, wherein the first-stage DCI provides the information related to the corresponding second-stage DCI, and the second-stage DCI provides the scheduling information of PDSCH(s) of the serving cells.

8. The method as claimed in claim 6, wherein the first-stage DCI provides the scheduling information of PDSCH in the one of the serving cells and the information related to the corresponding second-stage DCI, and the second-stage DCI provides the scheduling information of PDSCH(s) of the serving cells except for the one scheduled by the first-stage DCI.

9. The method as claimed in claim 1, wherein the HARQ process number indicates the HARQ process of the HARQ entity.

10. The method as claimed in claim 9, wherein the HARQ entity comprises a total of 16 HARQ processes in a time domain.

11. The method as claimed in claim 9, wherein the HARQ entity comprises a total of 16 HARQ processes in the time domain.

12. A method, comprising:
receiving a first higher-layer signal from a base station, wherein the first higher-layer signal enables the use of single PDCCH scheduling PUSCH(s) in two or more serving cells;
receiving a second higher-layer signal from the base station, wherein the second higher-layer signal enables the use of cross-carrier HARQ management within the serving cells;
receiving DCI in one of the serving cells to obtain the scheduling information of PUSCH(s) of the serving cells;

distributing uplink transport blocks to the scheduled PUSCH(s) in the serving cells from a HARQ entity of the one of the serving cells indicated in the DCI carried in a PDCCH for HARQ management based on a HARQ process number indicated in the DCI carried in the PDCCH; and transmitting the scheduled PUSCH(s) in the serving cells based on the received DCI.

13. The method as claimed in claim 12, wherein the second higher-layer signal comprises a cross-carrier HARQ management enabler to indicate whether cross-carrier HARQ management is enabled.

14. The method as claimed in claim 12, wherein the DCI in the one of the serving cells comprises a carrier indicator to indicate which serving cell for PUSCH scheduling is using the DCI, and to indicate which HARQ entity is for HARQ operation for the serving cells.

15. The method as claimed in claim 12, wherein the DCI in the one of the serving cells is generated by DCI aggregation of all of the serving cells.

16. The method as claimed in claim 15, wherein the DCI aggregation is 1-stage DCI aggregation; when the DCI aggregation is 1-stage DCI aggregation, the DCI in the one of the serving cells comprises the scheduling information of PUSCH(s) of the serving cells.

17. The method as claimed in claim 15, wherein the DCI aggregation is 2-stage DCI aggregation; when the DCI aggregation is 2-stage DCI aggregation, the DCI in the one of the serving cells comprises a first-stage DCI and a second-stage DCI.

18. The method as claimed in claim 17, wherein the first-stage DCI provides the information related to the corresponding second-stage DCI, and the second-stage DCI provides the scheduling information of PUSCH(s) of the serving cells.

19. The method as claimed in claim 17, wherein the first-stage DCI provides the scheduling information of PUSCH of the one of the serving cells and the information related to the corresponding second-stage DCI, and the second-stage DCI provides the scheduling information of PUSCH(s) of the serving cells except for the one scheduled by the first-stage DCI.

20. The method as claimed in claim 12, wherein the HARQ process number indicates the HARQ process of the HARQ entity.

* * * * *